United States Patent [19]

Aoi

[11] Patent Number: 4,700,335

[45] Date of Patent: Oct. 13, 1987

[54] METHOD AND APPARATUS FOR RECORDING A CONTINUOUS SPIRAL INFORMATION TRACK WITH DIFFERENT TRACK PITCHES

[75] Inventor: Shigeru Aoi, Yokohama, Japan

[73] Assignee: Canon Kabushiki Kaisha, Tokyo, Japan

[21] Appl. No.: 574,121

[22] Filed: Jan. 26, 1984

[30] Foreign Application Priority Data

Jan. 31, 1983 [JP] Japan .................................. 58-12660
Jan. 31, 1983 [JP] Japan .................................. 58-12661

[51] Int. Cl.$^4$ ...................... G11B 7/095; G11B 27/22
[52] U.S. Cl. ........................................ 369/44; 369/46; 369/54; 369/51
[58] Field of Search .................................. 369/43–48, 369/51, 54, 58, 32; 360/77

[56] References Cited

U.S. PATENT DOCUMENTS

| 4,142,209 | 2/1979 | Hedlund et al. | 360/77 |
| 4,290,122 | 9/1981 | Bates et al. | 369/43 |
| 4,363,116 | 12/1982 | Kleuters et al. | 369/32 |
| 4,453,239 | 6/1984 | Musha et al. | 369/44 |

Primary Examiner—Raymond F. Cardillo
Assistant Examiner—Robert A. Weinhardt
Attorney, Agent, or Firm—Fitzpatrick, Cella, Harper & Scinto

[57] ABSTRACT

An optical information recording method comprises a first step of scanning a radiation beam on a disk-like recording medium without effecting tracking control, and recording information as concentric circular or spiral information tracks for at least one round on the recording medium, and a second step of scanning the radiation beam while effecting tracking control so as to keep a predetermined interval with respect to an information track recorded one round previously, thereby recording the information on the recording medium.

7 Claims, 11 Drawing Figures

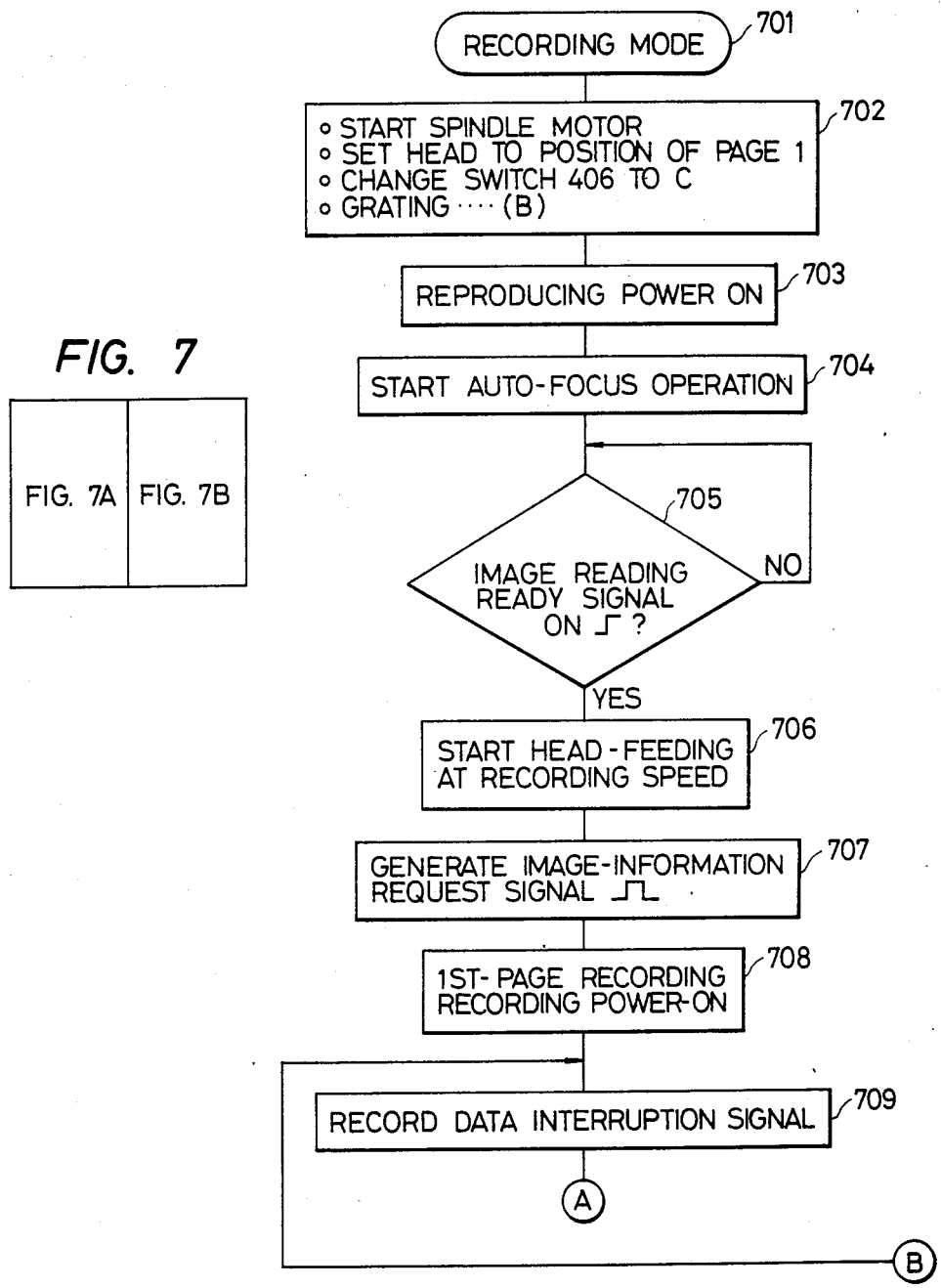

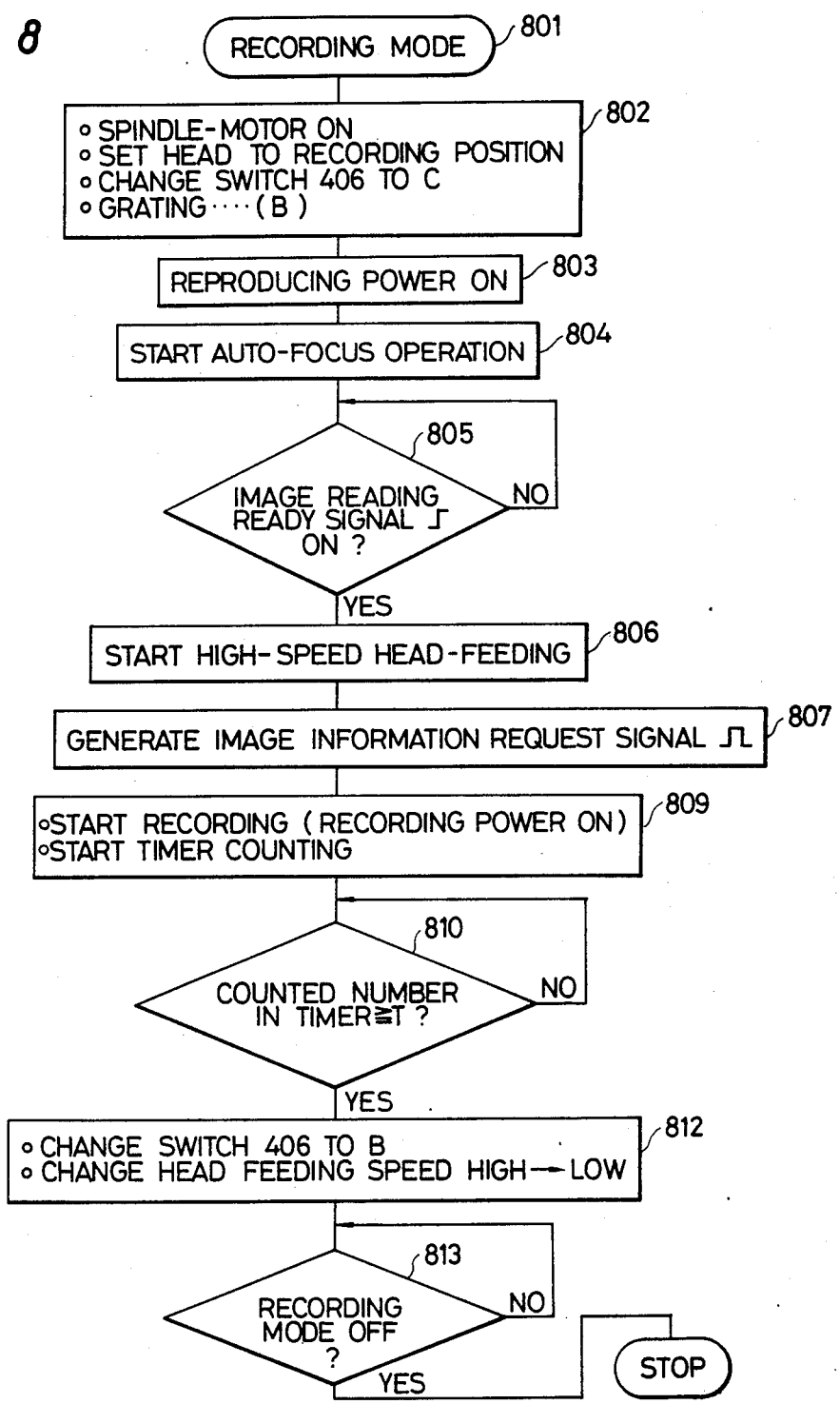

METHOD AND APPARATUS FOR RECORDING A CONTINUOUS SPIRAL INFORMATION TRACK WITH DIFFERENT TRACK PITCHES

BACKGROUND OF THE INVENTION

1. Field of the Invention

This invention relates to an optical information recording method and apparatus for recording information very densely at predetermined track intervals on a recording medium such as an optical disk or a magnetooptical disk.

2. Description of the Prior Art

The construction as shown in FIG. 1 of the accompanying drawings is known as an optical information recording apparatus. In FIG. 1, a laser beam emitted from a laser light source 101 is reflected by a polarizing beam splitter 102, passes through a quarter wave plate 103 and is condensed on a disk-like recording medium (disk) 105 by an objective lens 104, whereby recording is accomplished. The light reflected from the disk 105 passes through the objective lens 104 and the quarter wave plate 103 and further passes through the polarizing beam splitter 102 and through an astigmatic optical system 112, and is applied to a four-division light detector 107. In this manner, an auto-focus signal is taken and a lens driving device 105 is driven to thereby effect auto-focusing. The above-described optical system is disposed on a base plate and is called the recording head 108 as a whole.

The recording head 108 is moved radially of the disk by a head driving mechanism 109 and a head driving motor 110. The motor 110 is controlled by a motor control circuit 111 so that the recording head 108 is moved at a predetermined speed. Also, the disk 105 is rotated by a spindle motor 106, which in turn is controlled by a spindle motor control circuit 113 so that it revolves at a predetermined angular speed.

Thus, by feeding the recording head 108 at a predetermined speed and rotating the disk 105 at a predetermined speed, information may be recorded at predetermined track intervals on the disk 105.

However, in such a conventional apparatus, the mechanical accuracy of the driving portions such as the head driving device and the head driving motor has been limited, and in order to avoid any overlapped recording attributable to the eccentricity of the disk caused by the removal thereof or to the oscillation of the rotary shaft of the disk, it has been impossible to make the track intervals so narrow, and this has formed a hindrance to highly dense recording. This apparatus is such that a primary beam and a secondary beam are applied to the disk radially thereof at a predetermined interval and information is recorded by the primary beam while a guide track pre-formed on the disk or an information track recorded one revolution before is traced by the secondary beam. Accordingly, if one or several rounds of guide tracks are provided on the disk in advance, information can be recorded very densely without the fear of the overlapped recording as mentioned above.

However, providing the guide tracks on the disk in advance as described above has led to a disadvantage that the number of manufacturing steps of the disk is increased, to greatly increase the manufacturing cost thereof.

SUMMARY OF THE INVENTION

It is an object of the present invention to provide an optical information recording method and apparatus which is capable of recording information very densely without specially providing guide tracks or the like on a recording medium.

The present invention achieves the above object by an optical information recording method and apparatus in which a radiation beam is first scanned on a disk-like recording medium without effecting tracking control and information is recorded as concentric circular or spiral information tracks for at least one round on the recording medium, whereafter the radiation beam is scanned while tracking control is effected so as to keep a predetermined interval with respect to an information track recorded one round or revolution before, whereby information is recorded.

The invention will become more fully apparent from the following detailed description thereof taken in conjunction with the accompanying drawings.

BRIEF DESCRIPTION OF THE DRAWINGS

FIG. 8 is a flow chart showing the control procedure in a second embodiment of the optical information recording method of the present invention.

DESCRIPTION OF THE PREFERRED EMBODIMENTS

Figure 1:
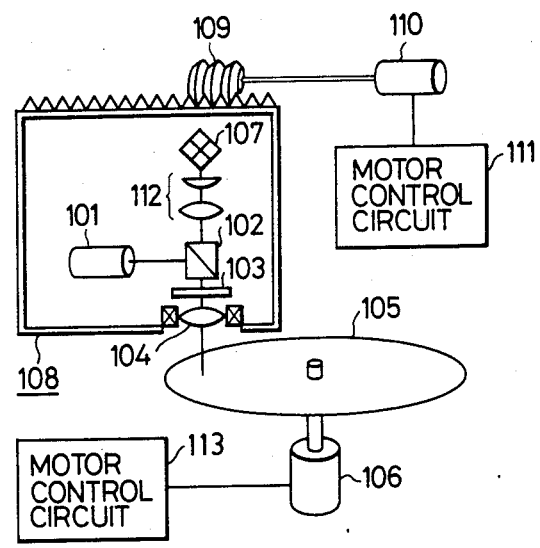
FIG. 1 is a schematic view showing an example of the construction of the optical information recording apparatus according to the prior art.
Figure 2:
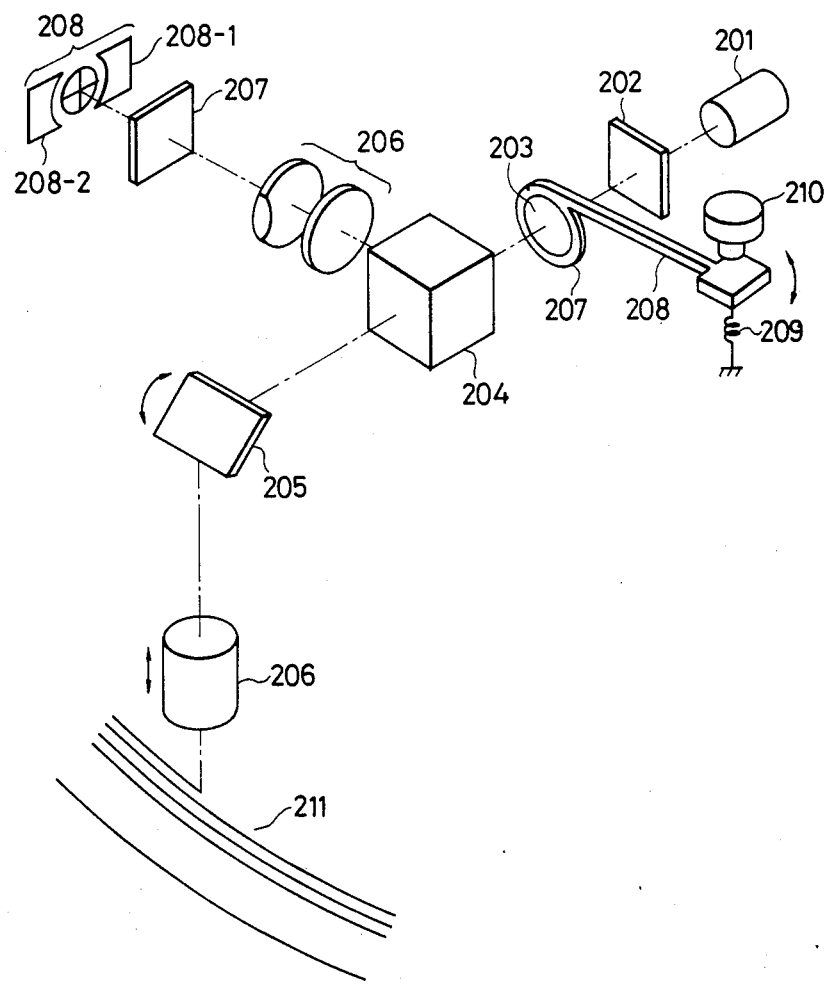
FIG. 2 is a schematic view showing an optical system according to an embodiment of the optical information recording apparatus based on the present invention.

FIG. 2 shows an optical system according to an embodiment of the optical information recording apparatus of the present invention. A laser beam emitted from a semiconductor laser source 201 has its plane of polarization shaped by a polarizer 202 and passes through grating 203, whereby it is divided into three beams as O-order (primary beam) and ±1st order (secondary beams) diffracted light. Thereafter, the beams pass through a polarizing beam splitter 204, are directed toward the tracks on a disk by a tracking mirror 205 and are condensed on the disk 211 through an objective lens 206. Thus, there are obtained three beam spots, respectively of the O-order and ±1st order diffracted lights.

The laser beam reflected by the disk 211 passes through the objective lens 206 and the tracking mirror 205, is reflected by the polarizing beam splitter 204, and passes through an ostigmatic optical system 206, and the polarized light of a signal component is separated by an analyzer 207 and reaches a light detector 208. Auto-focus, auto-tracking and Rf information signals are obtained from the light detector 208.

Figure 3A:
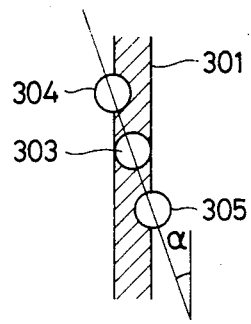
FIGS. 3A and 3B are plan views showing the arrangement of beam spots on a disk by the optical system of FIG. 2.

In the optical system shown in FIG. 2, when data reproduction is to be effected, the three beam spots on the disk (the laser light has a predetermined degree of output which cannot accomplish recording) are arranged relative to a track 301, as shown in FIG. 3A. The light spot 303 by the primary beam is a spot for reproducing recorded information. The light spots 304 and 305 by the secondary beams are half-superposed on the track 301 to obtain a signal for tracking on the track 301.

Figure 3B:
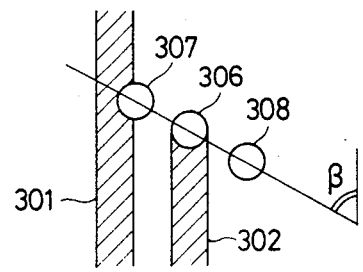

In the optical system shown in FIG. 2, when data recording is to be effected, the laser light emitted from the laser source 201 has energy capable of recording and is modulated by an information signal. The grating 203 is rotated by a slight angle, and three beam spots are arranged as shown in FIG. 3B. The track 301 is a track recorded one revolution of the disk earlier, and the track 302 is a track being currently recorded. That is, the spot 306 is a recording spot, and the spot 307 is arranged so as to be half-superposed on the track 301 recorded before one round to obtain a tracking signal. As to the laser powers of these three spots, the central spot 306 is an output sufficient to effect recording and the other two spots 307 and 308 are power-distributed so as to have a degree of output which does not effect recording. For example, power distribution is effected by the grating 203 so that if, for example, information tracks are formed on the surface of the medium for more than 4mW and are not formed thereon for less than 4mW, the central spot 306 is 6mW and the spots 307 and 308 are 2mW.

A record pattern may be formed, for example, by recording logic "1" or "0" on the disk by a binary signals, and for logic "1", the laser is caused to emit light by the above-mentioned output, and in the case of logic "0" as well, the laser is caused to emit light by one-half of the above-mentioned output to obtain a tracking signal.

The grating 203 is rotatable about the optic axis (not shown). A member 208 is extended from the mounting frame 207 of the grating and is pulled by a spring 209 curing reproduction. On the other hand, during recording, the member 208 is pulled by an electromagnet 210 to rotate the grating 203 slightly. For example, where the track width is 1 μm and the track pitch is 2 μm and the intervals between the three beams are 5.0 μm, respectively, the angle formed between the line passing through the centers of the three beams and the track is $\alpha = 0.57°$ (see FIG. 3A) during reproduction and $\beta = 1.72°$ (see FIG. 3B) during recording. Thus, if the length of the member 208 is 30 mm, the end portion of this member may be moved up and down by 0.6 mm.

Figure 4:
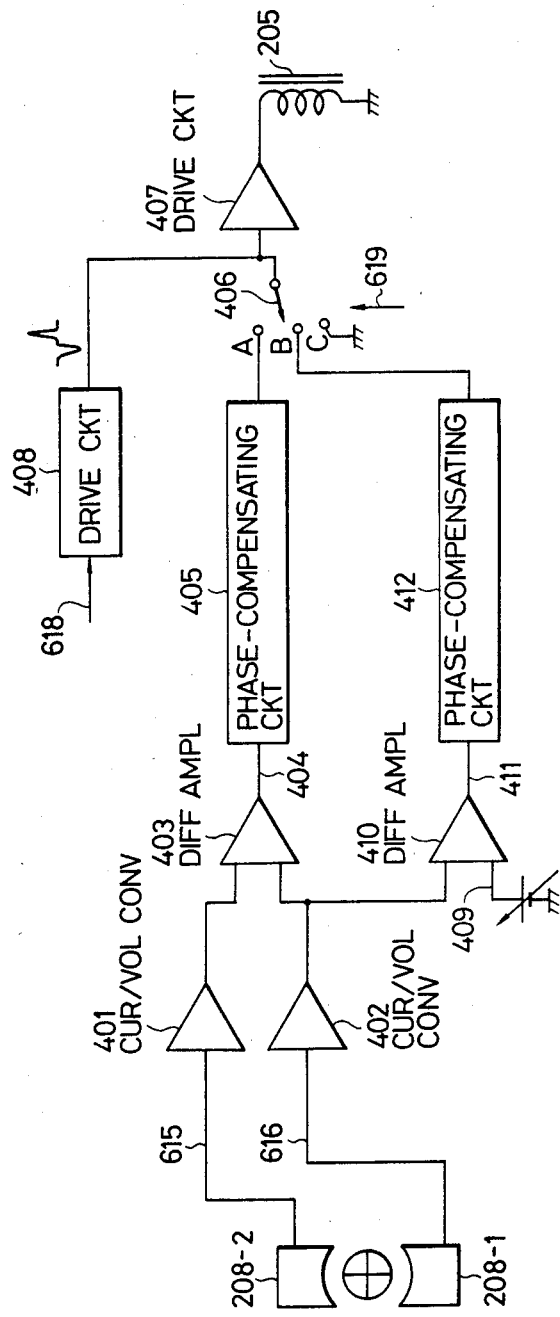
FIG. 4 is a block diagram of the tracking circuit according to the embodiment of FIG. 2.

FIG. 4 shows a block diagram of the tracking circuit according to the present embodiment. The laser beam reflected from the beam spot 304 or 307 shown in FIG. 3 reaches a light detector 208-1. Also, the laser beam from the beam spot 305 or 308 reaches a light detector 208-2. The photocurrents from the light detectors 208-1 and 208-2 are converted into voltages by current-voltage converting circuits 401 and 402, respectively. During reproduction, the difference between these voltages is taken by the use of a differential amplifier circuit 403 and the deviation of the track is obtained in the form of a voltage value 404 (tracking signal).

Figure 5:
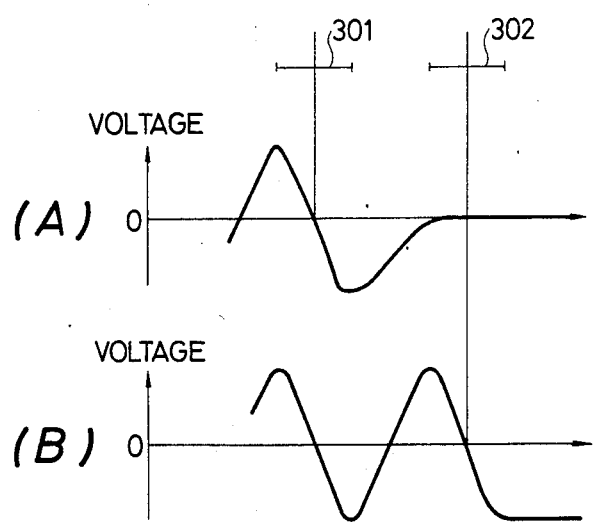
FIGS. 5 (A) and (B) show tracking signals corresponding to FIGS. 3A and 3B, respectively.

FIG. 5 (A) shows the tracking signal 404 corresponding to FIG. 3A. In FIG. 5 (A), the vertical axis represents the voltage and the horizontal axis represents the position of the central beam. The shown tracking signal 404 drives the tracking mirror 205 through a phase-compensating circuit 405, a switch 406 and a drive circuit 407 and effect tracking.

The switch 406 is closed at its side A during reproduction and closed at its side B during recording. When recording is to be effected, it is only 307 of the two tracking spots 307 and 308 that is on the track and therefore, use is made only of the output signal 616 of the light detector 208-1 which receives the reflected light from this spot 307. The output voltage of the current-voltage converting circuit 402 is compared with a constant voltage signal 409 by a differential amplifier 410.

FIG. 5 (B) shows the output signal 411 of the differential amplifier 410 corresponding to FIG. 3B. The voltage value of the constant voltage signal 409 is preset so as to be equal to the voltage value when the reflected light where the spot 307 is half-superposed on the track 301 reaches the light detector 208-1 and is supplied to the differential amplifier 410 through the current-voltage converting circuit 402. The output signal 411 of the differential amplifier 410 drives the tracking mirror 205 through a phase-compensating circuit 412, the switch 406 and the drive circuit 407 and effects tracking. Designated by 408 is a drive circuit for causing the tracking mirror 205 to jump to the preceding track. The drive circuit 408 is operated by a signal 618 from a controller 602 (see FIG. 6).

Figure 6:
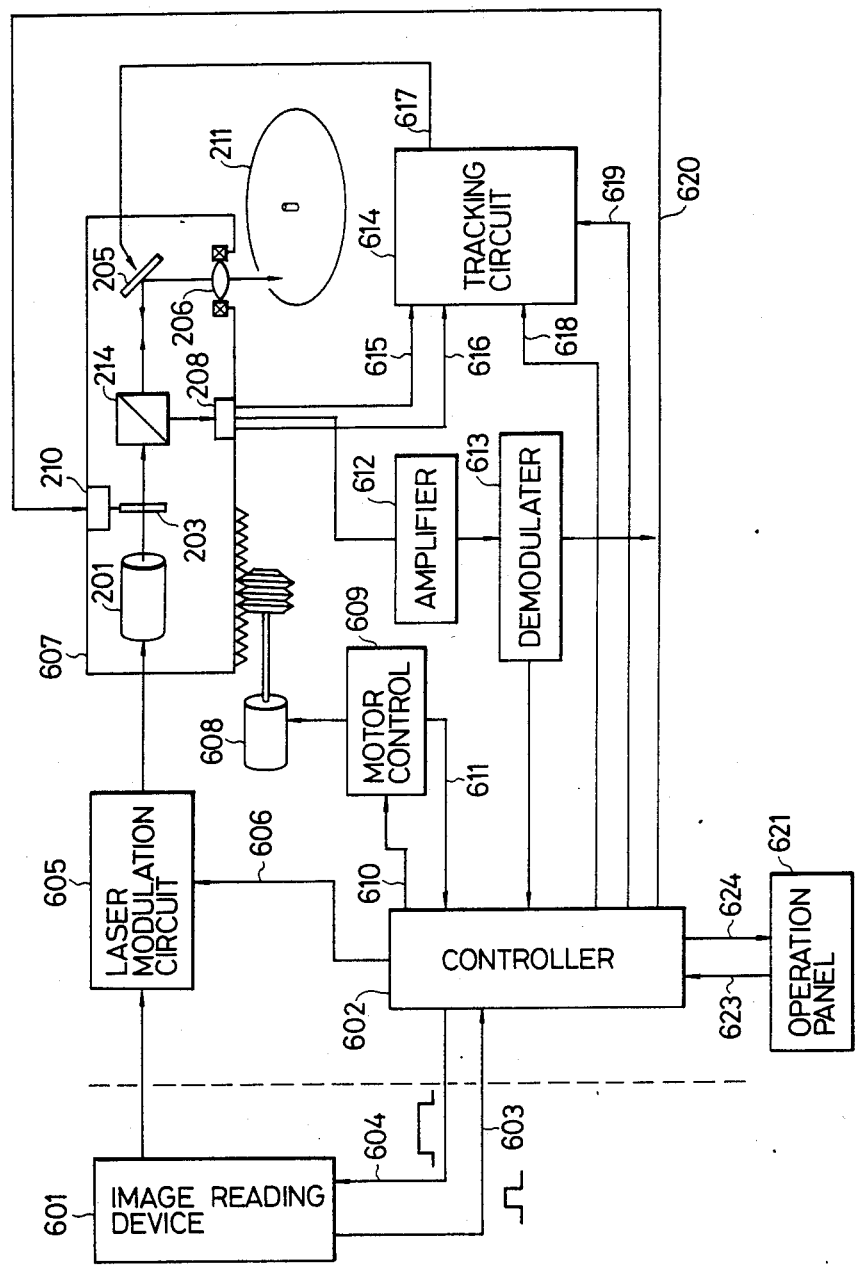
FIG. 6 is a block diagram showing the entire construction of an embodiment of the optical information recording apparatus based on the present invention.

FIG. 6 is a block diagram showing the whole of an embodiment of the optical disk recording-reproducing apparatus to which the present invention is applied. In FIG. 6, reference numeral 601 designates an image reading device which supplies an image reading ready signal 603 to the controller 602. This signal 603 is switched on upon completion of reading preparation and is switched off when the reading is completed. Image information is supplied to a laser modulation circuit 605 in accordance with an image information request signal 604 (a rectangular wave) from the controller 602. The laser modulation circuit 605 modulates the image information into MFM and puts out it as a laser driving signal. Also, change-over of the laser power is effected by an indication signal 606 from the controller 602 (that is, the output differs between recording and reproduction). The laser driving signal from the laser modulation circuit 605 is supplied to the laser light source 201 of a recording-reproducing head 607 and effects recording or reproduction. The radial driving of the disk in the head 607 is effected under the control of a motor control circuit 609 and by the use of a head driving motor 608. A control signal 610 for controlling the high speed and the low speed of the motor 608 is supplied from the controller 602 to the motor control circuit 609. A signal 611 representative of the head position is supplied from the motor control circuit 609.

During reproduction, signals read by the light detectors 208 are amplified by an amplifier 612 and demodulated into image information signals by a demodulator 613. If these information signals, the synchronizing signal and the signals representative of the beginning and end of the image information are supplied also to the controller 602.

Reference numeral 614 designates the tracking circuit shown in FIG. 4. The tracking circuit 614 delivers a tracking mirror driving signal 617 with the signals 615 and 616 from the tracking light detectors 208 as the input signals, and drives the mirror. Further, it effects the jump to the preceding track in response to the signal from the controller 602. The signal 619 from the controller 602 effects the change-over of the switch 406 (see FIG. 4). The signal 620 from the controller 602 effects ON/OFF control of the electromagnet 210 and rotates the grating 203. Reference numeral 621 designates an operation panel which supplies a command signal 623 for recording or reproduction to the controller 602 by various switches (not shown) and displays the state of the apparatus to the operator in accordance with a signal 624 indicative of said state.

Figure 7B:
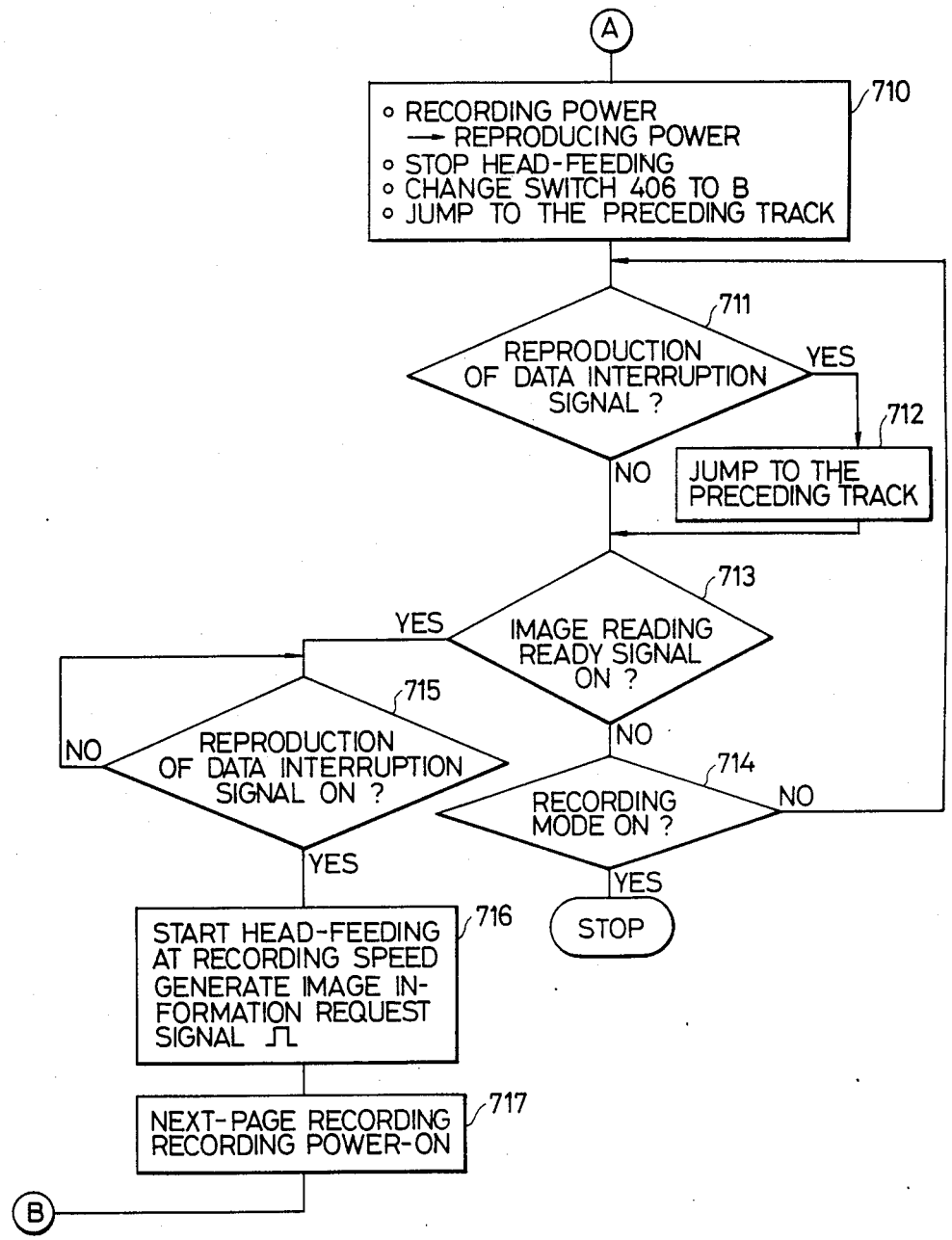
FIG. 7 composed of FIGS. A and B is a flow chart showing the control procedure in a first embodiment of the optical information recording method of the present invention.

FIG. 7 is a flow chart showing the control procedure in a first embodiment of the optical information recording method of the present invention using the apparatus shown in FIG. 6.

The control during recording will hereinafter be described. Here, description will be made of a case where an original comprising several pages is regarded as a series of data and this is read by a reading device and converted into an image information signal which in turn is recorded spirally on a disk. It is also to be understood that the information is discontinued between a page and a page.

Selection of the recording mode is effected in the operation panel 621 (step 701) and, when an address to be recorded is indicated (by signal 623), the controller 602 puts out an instruction to a spindle motor control circuit (not shown) and causes rotation of the disk to be started. Simultaneously therewith, the controller 602 supplies to the head driving motor control circuit 609 a head driving signal 610 for moving the head to the address to be recorded. Also, the controller 602 supplies a signal 619 for closing the switch 406 (see FIG. 4) at its side C and opens a tracking servo loop.

To effect recording, the grating 203 is rotated and provides the spot arrangement as shown in FIG. 3B. For this purpose, a signal is supplied to the electromagnet 210 (step 702).

Next, the laser is turned on so that the reproducing power is emitted (step 703) and auto-focus operation is effected (step 704).

When the ready signal 603 from the image reading device is switched on (step 705), feeding of the head at the recording speed (low speed) is started (step 706) and a rectangular wave is put out as an image information request signal (step 707). Image information is supplied from the image reading device in accordance with the image information request signal to modulate the laser and recording of the first page is effected (step 708). In this manner, the information of the first page is recorded spirally on the disk only by the feeding accuracy of the head without tracking control being effected.

At the end of the recorded information corresponding to one page, a data interruption signal indicative of the fact that the recorded information corresponding to one page has come to an end is recorded on the end of the track (step 709). Simultaneously therewith, the reading ready signal 603 (see FIG. 6) is switched off and change-over is effected from the recording laser power to the reproducing laser power. At the same time, the switch 406 (see FIG. 4) is closed at its side B to thereby start the tracking control of the beam.

Also, a rectangular wave signal 618 is put out from the controller 602 to the tracking circuit 614 and the light beam is caused to jump to the preceding track. Thus, the primary beam 306 follows from the recorded track 302 to the track 301 recorded before one round (step 710).

When the tracking corresponding to one round of the disk has been effected and the data interruption signal has been again reproduced (step 711), the beam spots jump to the preceding track (step 711). The tracking of one round of the track recorded last is continued until a signal indicative of the fact that the image recording ready signal is ON (step 713) or that the recording mode is OFF (step 714) is confirmed.

When the image reading ready signal is received from the reading device (step 713), reproduction of the data interruption signal is confirmed (step 715) and the feeding of the head at the recording speed is started to produce an image information request signal (step 716) and recording of the next page is effected (step 717).

As regards the recording thereafter, tracking control is effected with the switch 406 (see FIG. 4) remaining closed at its side B and information is recorded at a predetermined interval with respect to the track recorded before one round. That is, in the optical information recording apparatus of the present embodiment, the signals of the first page are recorded without tracking control being effected and recording of the second and subsequent pages is effected while tracking control is being effected with the information track of the first page as the reference.

FIG. 8 is a flow chart showing the control procedure in a second embodiment of the optical information recording method of the present invention. Again in the method of the present embodiment, description will be made by the use of the apparatus shown in FIGS. 2–6.

In the operation panel 621, selection of the recording mode is effected (step 801) and, when an address to be recorded is indicated (by signal 623), the controller 602 puts out an instruction to the spindle motor control circuit (not shown) and causes rotation of the disk to be started. Simultaneously therewith, the controller 602 supplies to the head driving motor control circuit 609 a head driving signal 610 for moving the head to the address to be recorded. Also, the control 602 supplies a signal 619 for closing the switch 406 (see FIG. 4) at its side C and delivers a signal 620 for setting the grating 203 as shown in FIG. 3B (step 802). Subsequently, to effect auto-focus operation, the laser is caused to emit light at the power during reproduction (step 803), whereby auto-focus state is brought about (step 804).

When the reading ready signal 603 from the image reading device 601 is switched on (step 805), the controller 602 starts to feed the head at a high speed slightly higher than the recording speed (step 806) and delivers an image information request signal 604 to the image reading device 601 (step 807). When image information is supplied from the image reading device 601, recording on the disk is started. Simultaneously with the start of the recording on the disk, counting by a timer (in the controller 602) is started (step 809). When the counted time by the timer reaches a predetermined time T corresponding to one full rotation or more of the disk (step 810), the switch 406 (see FIG. 4) is changed over to its side B to change the head feeding speed to the recording speed (low-speed) (step 812). Thereafter, recording is continued until all the recording is completed at a predetermined interval with respect to the preceding track by tracking control, that is, until the recording mode becomes OFF (step 813).

In the above-described method, the first one round or several rounds of the information track to be recorded are recorded without tracking control being effected and with this as the reference, the subsequent recording is effected while tracking control is being effected. It is for the purpose of securing a wide track pitch and thereby avoiding any overlapped recording resulting from vibration or the like that the head feeding speed has been made high while tracking control is not effected. In the present embodiment, as compared with the first embodiment, the time during which the tracking loop remains open can be shortened, and this leads to the effect of reducing the possibility that erroneous recording such as overlapped recording results from vibration or the like within this time.

In the above-described embodiments, the tracking mirror 205 (see FIG. 2) is used as an optical element to be driven, but it is also possible to design the objective lens so as to be driven in parallelism to the disk.

The present invention is not restricted to the above-described embodiments, but various applications thereof are possible. For example, in the illustrated embodiments, an example of the apparatus in which recording and reproduction are effected by the same head has been shown, but the recording head may be provided independently. Also, the timing at which tracking is started is not restricted to that obtained from the end of information, the timer or the like, but design may also be made such that tracking is started when one round or more has been recorded by the revolution of the motor or the like. Also, the information tracks recorded on the disk-like recording medium may be of a concentric circular shape or a spiral shape.

What I claim is:

1. An optical information recording method comprising the steps of:
    irradiating, in a first step, a first radiation beam on a disk-like rotating recording medium, while moving the first radiation beam in a radial direction of the recording medium at a predetermined speed, without effecting tracking control, to record information for at least one round on the recording medium; and
    irradiating, in a second step, the first radiation beam and at least one second radiation beam on said rotating recording medium so that the second radiation beam overlaps with the information track recorded in said first step, to integrally move the first and second radiation beams in the radial direction of the recording medium at a speed lower than said predetermined speed, while effecting tracking control in accordance with a tracking signal detected from the second radiation beam which is modulated by the information track, thereby to record continuously a spiral information track following the information track recorded in said first step, the second radiation beam being located so as to be spaced from the first radiation beam in the radial direction of the recording medium by a predetermined distance.

2. An optical information recording method according to claim 1, wherein said first step is continued until a first series of information is recorded on said recording medium.

3. An optical information recording method according to claim 1, wherein said first step is continued until a predetermined time elapses after recording is started on said recording medium for the first time.

4. An optical information recording apparatus comprising:
    means for rotating a disk-like recording medium;
    means for irradiating first and second radiation beams, which are spaced from each other in a radial direction of the recording medium by a predetermined distance, on the recording medium to record information on the recording medium using the first radiation beam;
    means for detecting a tracking signal on the basis of a beam generated by the second radiation beam modulated by an information track recorded one round previously;
    means for effecting the tracking control of the first and second radiation beams in accordance with the tracking signal;
    means for moving the first and second radiation beams in the radial direction of the recording medium, said moving means being capable of selectively changing a speed of said movement of the first and second radiation beams; and
    control means for detecting that information has been recorded for at least one round on the recording medium by the first radiation beam to control said moving means so as to change said speed.

5. An optical information recording apparatus according to claim 4, wherein said tracking means has a switch controlled by said control means and opening and closing a servo loop.

6. An optical information recording apparatus according to claim 4, wherein said control means operates said tracking means after a predetermined time elapses after recording has been started on said recording medium for the first time.

7. An optical information recording apparatus according to claim 6, wherein said control means comprises a timer adapted to start counting simultaneously with the start of recording on said recording medium, and means for comparing the count of said timer with a predetermined time and supplying an operation starting signal to said tracking means when the count reaches the predetermined time.

* * * * *